United States Patent [19]

Piber

[11] E Re. 30,546

[45] Reissued Mar. 10, 1981

[54] FUNCTION INDICATION MEANS FOR ELECTRIC SWITCHES

[75] Inventor: Earl T. Piber, Oconomowoc, Wis.

[73] Assignee: Eaton Corporation, Cleveland, Ohio

[21] Appl. No.: 893,887

[22] Filed: Apr. 6, 1978

Related U.S. Patent Documents

Reissue of:

[64] Patent No.: 3,995,132
Issued: Nov. 30, 1976
Appl. No.: 604,786
Filed: Aug. 14, 1975

[51] Int. Cl.[2] ..... H01H 9/16

[52] U.S. Cl. ..... 200/308; 116/278; 116/322

[58] Field of Search ..... 200/308, 309, 315, 316, 200/339; 116/124 R, 124 L, 124.1 R, 124.1 A, 124.3, 125, 135, DIG. 14, DIG. 28, 278, 322

[56] References Cited

U.S. PATENT DOCUMENTS

| | | | |
|---|---|---|---|
| 3,644,694 | 2/1972 | Morin et al. | 200/308 |
| 3,824,948 | 7/1974 | Faloon | 200/308 X |
| 3,885,116 | 5/1975 | Kodaira et al. | 200/315 |
| 3,928,743 | 12/1975 | Ohashi | 200/308 |

FOREIGN PATENT DOCUMENTS

| | | | |
|---|---|---|---|
| 1260088 | 1/1972 | United Kingdom | 200/308 |

*Primary Examiner*—Stephen Marcus
*Attorney, Agent, or Firm*—Hugh R. Rather; William A. Autio

[57] ABSTRACT

A rocker switch having non-illuminated indicator means comprising a ribbon or sheet member which effectively slides along the interior surface of a rocker cap having a window visually exposing the appropriate indicia on the ribbon as the rocker is pivoted. The ribbon is flexible enough to assume the interior shape of the rocker cap and stiff enough to slide therealong during rocking operation. A window or lens may assume various positions on the rocker cap with appropriate positioning of indicia on the ribbon therebeneath.

5 Claims, 9 Drawing Figures

FUNCTION INDICATION MEANS FOR ELECTRIC SWITCHES

Matter enclosed in heavy brackets [ ] appears in the original patent but forms no part of this reissue specification; matter printed in italics indicates the additions made by reissue.

BACKGROUND OF THE INVENTION

Rocker switches having non-illuminated visual indicator means are known in the prior art. However these prior switches have been subject to one or more disadvantages such as complexity of design and high cost. This invention relates to improvements thereover.

SUMMARY OF THE INVENTION

An object of the invention is to provide an improved non-illuminated indicating means for electric switches.

Another object of the invention is to provide indicating means of the aforementioned character providing function information in a rocker switch.

Another object of the invention is to provide indicating means of the aforementioned character capable of multi-positional window placement for visual exposition of indicia.

Another object of the invention is to provide a simple and economical indicating means of the aforementioned type.

DESCRIPTION OF THE PREFERRED EMBODIMENT

Figure 1:
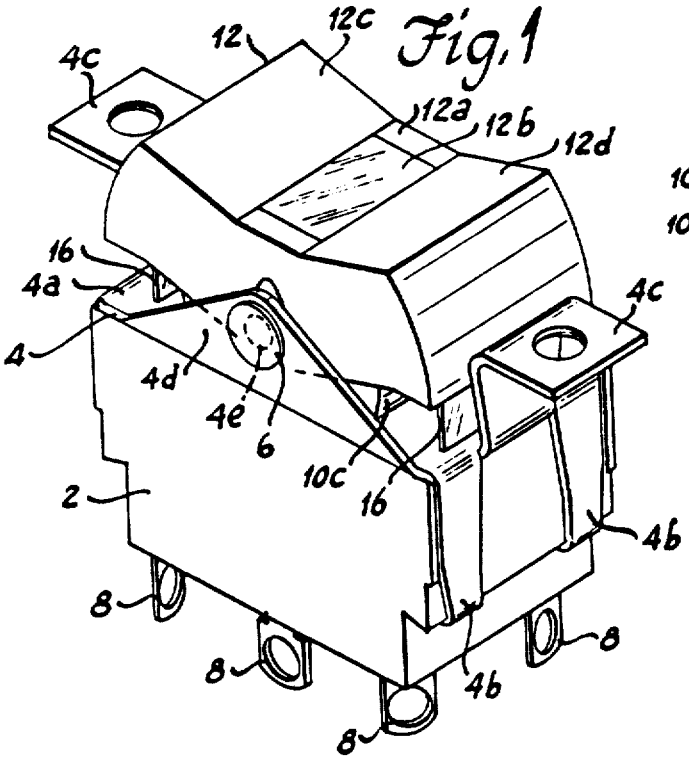
FIG. 1 is an isometric view of a rocker switch constructed in accordance with the invention.

Referring to the drawings, the electric switch includes a casing consisting of a box-like insulated switch base 2 and a punched and stamped sheet metal switch frame 4. Switch frame 4 is provided with a cover portion 4a overlying and substantially closing the cavity in base 2. The switch frame also has portions 4b bent downwardly to provide securement of the frame to base 2. Upwardly and outwardly bent portions 4c of the switch frame provide mounting brackets, and generally triangular portions 4d bent upwardly and in parallel with the side walls of base 2 have aligned apertures 4e to accommodate the end portions of a pivot pin 6.

Figure 3:
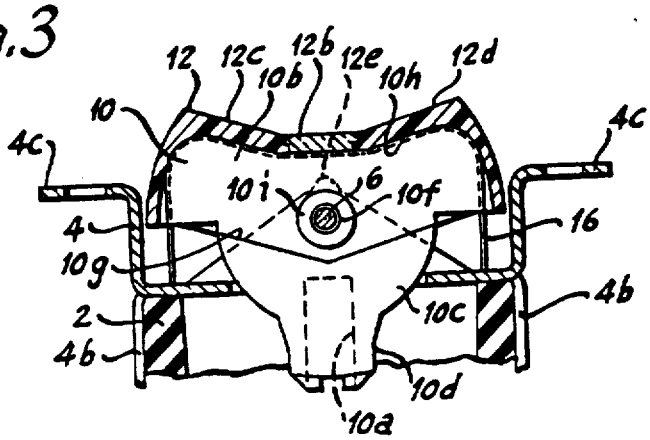
FIG. 3 is a cross-sectional view taken along line 3—3 of FIG. 2.

The switch contacts and operating mechanism contained within base 2 form no part of the present invention, so disclosure and description of the same is omitted for the sake of clarity. As will be appreciated switch contacts and operating mechanisms that can be used with the present invention can take various forms with one preferred form being like that described in U.S. Pat. No. 2,927,983. It may be assumed that stationary contacts within the base 2 have electrical connection with terminals 8 which extend downwardly from the lower surface of the base. As best shown in FIG. 3, a rocker type operator 10 has an integral depending shank portion 10d which extends downwardly within the cavity of base 2 and carries an elongated recess 10a in which may be assumed to be a spring biased contactor operating lever (not shown) of the type shown in the aforementioned patent.

Figure 9:
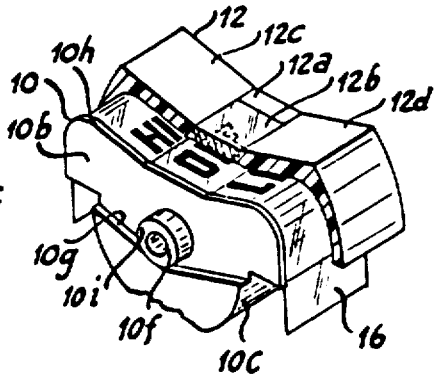
FIG. 9 is an isometric view, partially cut away, of the rocker, indicia bearing ribbon and rocker cap.

As shown in FIG. 9, a detachable snap-on rocker cap 12 fits over rocker 10 in a shell-like manner and is rigidly mounted thereon, as will be described more fully hereinafter. As seen in FIG. 3, rocker 10 comprises a generally T-shaped integral member having a top portion 10b, a generally semi-circular intermediate stem portion 10c, and an integral depending shank portion 10d. The top portion 10b is formed with a central flat surface, two inclined flat surfaces extending oppositely therefrom at equal obtuse angles, and two curved surfaces extending from said inclined flat surfaces. The semicircular portion 10c is provided with a bushing-like protrusion 10i and a pivot aperture 10f of circular cross-section extending therethrough. Pivot pin 6 extends through the aligned apertures 4e and 10f and through corresponding apertures on the opposite side of the rocker and frame (not shown) to provide pivotal support of the rocker, widened ends of the pin acting as retainers therefor.

As shown in FIG. 9, the rocker further has a shallow V-shaped ledge 10g formed on each side of the semi-circular stem portion 10c below the apertures 10f, and a raised shoulder 10h on each side of and running the entire length of the top portion 10b.

Figure 5:
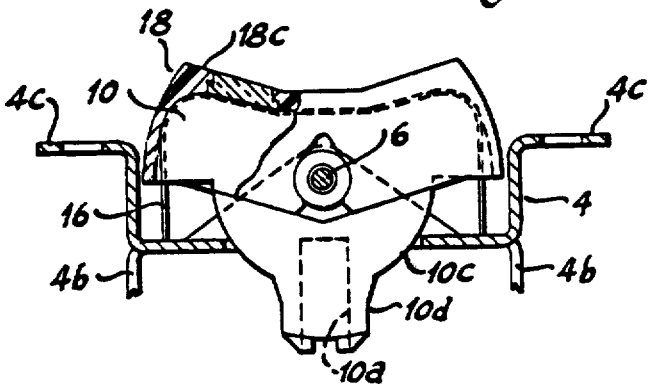
FIG. 5 is a side elevational view, partially cut away, of the switch of FIG. 1, but having a modified window placement.

Rocker cap 12 has an interior contour complementally conformed to the shape of the top portion 10b of the rocker, and an exterior having a central flat surface 12a with a transparent window 12b therein and two opaque inclined flat surfaces 12c and 12d extending oppositely therefrom at equal obtuse angles. As seen in FIGS. 3 and 5, the rocker cap has a downwardly opening slot 12e on each side thereof for engaging in a snap-on manner the bushing-like protrusion 10i around pivot pin 6. The lower edges of the rocker cap are seated by and stopped against the ledges 10g of the rocker and the interior of the rocker cap is seated by and stopped against the shoulders 10h of the rocker to provide a small clearance gap or passageway between the top surfaces of rocker and the top interior surfaces of the rocker cap and to provide unified rocking action of the rocker cap and rocker.

A thin acetate ribbon, strip or sheet 16, which in one preferred form is approximately 0.010 inch thick, is slidably received within the passageway. The ribbon may also be formed of nylon, mylar, kapton or any other comparable semi-plastic semi-flexible material or the like. This ribbon extends up from the cover portion 4a of the frame, then into the passageway passing beneath the transparent window in the rocker cap, and then down to the cover portion again, as seen in FIG. 3. As seen in FIGS. 1 and 9, the ribbon must be flexible enough to substantially assume the shape of the interior contour of the rocker cap, yet stiff enough to slide therealong as the rocker is pivoted with the cover portion 4a of the frame acting as a stop therefore. The ribbon must also have a low coefficient of friction to enable it to slide through the passageway. *The ribbon is sufficiently rigid to prevent buckling of its lower end sections upon pivoting of the rocker such that part of one of its lower end sections enters the passageway and the bottom edge of the other lower end section remains in substantial abutment with top housing cover 4a and the ribbon effectively slides through the passageway deflectably conforming to the shape thereof to expose a different segment of the ribbon through the window.*

Figure 2:
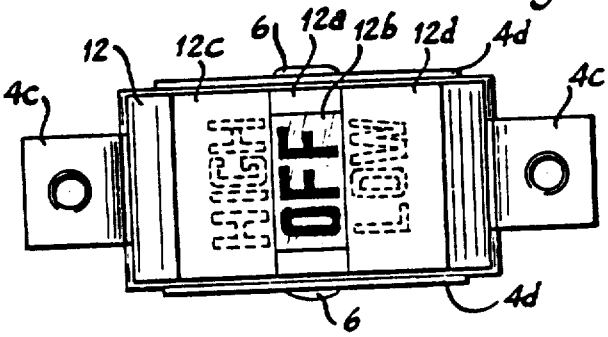
FIG. 2 is a top view of the switch shown in FIG. 1.
Figure 4:
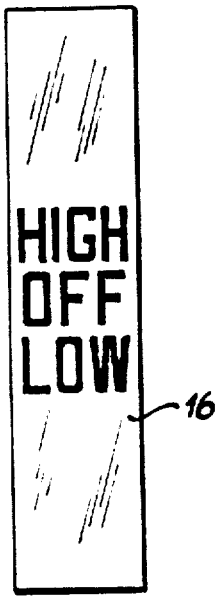
FIG. 4 is a view of an indicia bearing ribbon in disassembled condition.

As seen in FIG. 4, the ribbon is marked with appropriate indicia for providing function information. As seen in FIGS. 2 and 9, with the rocker cap in its center position, the transparent window will visually expose the indicia "OFF". Right and left rocking of the rocker cap and rocker will cause visual exposition of "LOW" and "High", respectively.

As seen in FIG. 5, a window may also be placed on inclined flat surface 18c of rocker cap 18. During molding of the rocker cap, the window opening is formed from below in order to assure a flush surface for the ribbon to slide along after the window is placed therein. With the window in the center, as shown in FIG. 3, the opening may be formed from above because the ribbon will bow out slightly from the center interior surface of the rocker cap and hence the bottom of the window need not be perfectly flush with the interior surface of the rocker cap.

Figure 6:
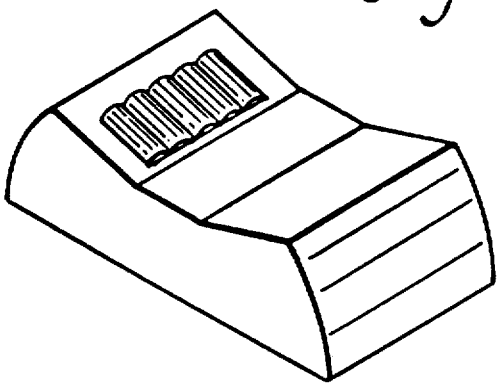
FIG. 6 is an isometric view of a rocker cap showing a window placement therein.
Figure 7:
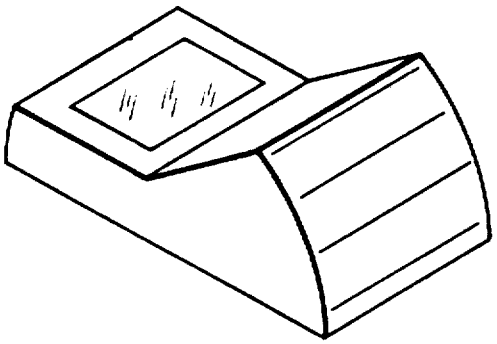
FIG. 7 is a view like FIG. 6 but showing another window placement therein.
Figure 8:
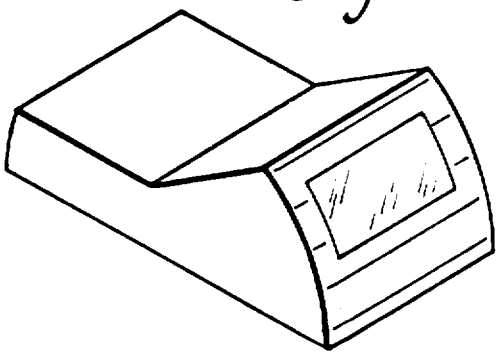
FIG. 8 is a view like FIG. 7 but showing yet another window placement therein.

FIG. 6 shows an alternate embodiment wherein a refractive lense may be used. FIGS. 7 and 8 show alternate rocker caps and window placements therein.

It is to be appreciated that the invention encompasses many variations of rocker caps, windows, window placements, ribbons and indicia, all within the scope of the present invention.

It is further to be appreciated many types of operators other than rockers and rocker caps may be used, for example, any type of movable operator having a window to expose a ribbon or sheet constrained against moving with the operator will provide the conceived means of indication.

I claim:

[1. An electric switch having function indication means comprising a sheet-like elongated ribbon having stationary ends and slidably extending longitudinally through a movable operator having a window, said ribbon being in continuous contiguous facing relationship with said window throughout movement of said operator, said ribbon sliding tangentially through said operator in response to movement of said operator, said window visually exposing different portions of said ribbon during movement of said operator as said window slides longitudinally along said ribbon.]

[2. In an electric switch, the combination comprising:

a housing;

operator means having a window and mounted to said housing for movement relative thereto for effecting switching operations, said operator means having a thin passageway formed therethrough generally along an inner perimeter of an external portion thereof and passing beneath said window; and a sheet-like elongated laterally flexible ribbon deflectably and slidably extending longitudinally through said passageway and constrained at its ends against longitudinal movement by said housing so that upon movement of said operator means said ribbon deflectingly slides tangentially through said passageway in continuous contiguous facing relationship with said window throughout said operator movement whereby different portions of said ribbon will be visually exposed by said window as said window slides longitudinally along said ribbon.]

[3. The combination according to claim 2 wherein said operator means comprises an operating member and a cap member mounted to and spaced from said operating member to afford said passageway therebetween.]

[4. The combination according to claim 2 wherein said ribbon is formed of a material and has a thickness such that it is sufficiently flexible to contour to the shape of said passageway but also sufficiently rigid to slide therethrough during movement of said operator means. ]

[5. In a rocker switch, the combination comprising a sheet-like elongated laterally flexible ribbon having stationary ends and deflectably and slidably extending longitudinally through a rockable operator having a window, said ribbon being in continuous contiguous facing relationship with said window throughout rocking of said operator, said ribbon deflectingly sliding tangentially through said operator in response to rocking of said operator, said window visually exposing different portions of said ribbon during rocking of said operator whereby to afford operator position indication as said window slides longitudinally along said ribbon.]

[6. In a rocker switch, the combination comprising:

a housing;

operator means having a window and pivotally mounted to said housing for effecting switching operations, said operator means having a thin passageway formed therethrough generally along an inner perimeter of an external portion thereof and passing beneath said window; and a sheet-like elongated laterally flexible ribbon deflectably and slidably extending longitudinally through said passageway and constrained at its ends against longitudinal movement by said housing so that upon pivoting of said operator means said ribbon deflectingly slides tangentially through said passageway in continuous contiguous facing relationship with said window throughout said pivoting whereby different portions of said ribbon will be visually exposed by said window as said window slides longitudinally along said ribbon.]

[7. In a rocker switch, the combination comprising:

a housing;

a rocker pivotally mounted to said housing for effecting switching operations;

a shell-like cap having a window and overlying said rocker, said cap having an inner perimeter surface complementally conformed to said rocker;

means mounting said cap for pivotal movement relative to said housing in unison with said rocker and spacing said cap from said rocker whereby to afford a thin passageway between said rocker and said cap along said inner perimeter; and a sheet-like elongated laterally flexible ribbon deflectably and slidably extending longitudinally through said passageway and constrained at its ends against longitudinal movement by said housing so that upon rocking of said rocker and said cap said ribbon deflectingly slides tangentially through said passageway in continuous contiguous facing relationship with said window throughout said rocking whereby different portions of said ribbon will be visually exposed by said window as said window slides longitudinally along said ribbon.]

[8. The combination according to claim 7 wherein said ribbon is formed of a material and has a thickness such that it is sufficiently flexible to contour to the shape of said passageway, but also sufficiently rigid to slide therethrough during rocking of said rocker and said cap.]

[9. The combination according to claim 7 wherein said mounting means comprises shoulders and ledges formed on said rocker for seating said cap.]

[10. The combination according to claim 9 wherein said mounting means further comprises detent means formed in said cap and said rocker for pivotally mounting said cap to said housing.]

[11. An electric switch comprising:

a housing;

contact means mounted in said housing;

operator means pivotally mounted to said housing for actuating said contact means and including a rocker button outer portion having a thin passageway extending therethrough about the pivotal axis of said operator means to form an inner perimeter generally parallel to and coextensive with the outer perimeter of said rocker button outer portion;

a window in said rocker button outer portion visually exposing part of said passageway;

a sheet-like elongated laterally flexible ribbon extending longitudinally through said passageway and having rocker position indicating means thereon and having both of its ends constrained by said housing against longitudinal movement while allowing deflection of its intermediate portion, said ribbon generally conforming to the shape of said passageway such that in response to pivoting of said operator means said ribbon deflectingly slides through said passageway tangentially along said inner perimeter to expose different portions of said indicating means through said window as said ribbon slides therebeneath, said ribbon and said window being in continuous contiguous facing relationship throughout pivoting of said operator means as said window slides longitudinally along said ribbon.]

[12. The switch according to claim 11 wherein said operator means comprises a rocker actuator pivotally mounted to said housing for actuating said contact means and wherein said rocker button outer portion comprises a portion of said rocker actuator external of said housing and a shell-like cap overlying and complementally conformed to said external portion of said rocker actuator and spaced therefrom to form said passageway therebetween.]

[13. The switch according to claim 11 wherein said ribbon has a width extending parallel to said pivotal axis, and wherein both ends of said ribbon extend beyond said passageway parallel to each other and stopped against said housing, and wherein said ribbon is formed of a material and has a thickness such that it is sufficiently flexible to contour to the shape of said passageway and also sufficiently rigid to slide therethrough during pivoting of said operator without buckling in that portion of said ribbon extending beyond said passageway.]

[14. The switch according to claim 11 wherein said rocker button outer portion has a shallow generally M-shaped outer perimeter about said pivotal axis having a pair of oppositely inclined surfaces disposed on opposite sides of said pivotal axis and wherein said passageway and inner perimeter have a shallow rounded generally M-shaped configuration.]

*15. In a rocker switch, the combination comprising:*

*a housing;*

*rocker operator means pivotally mounted to said housing for effecting switching operations, said rocker operator means having an external rocker portion having a window formed therein and a thin passageway formed therethrough generally along an inner perimeter thereof and passing beneath said window;*

*a sheet-like elongated laterally flexible ribbon deflectably and slidably extending longitudinally through said passageway and confined by said passageway to emerge downwardly in substantially parallel lower end sections spaced on opposite sides of the pivotal axis of said rocker operator means, said lower end sections extending a short distance and having bottom edges freely abutting said housing, said ribbon being sufficiently rigid to prevent buckling of said lower end sections upon pivoting of said rocker operator means such that part of one of said lower end sections enters said passageway and the bottom edge of the other of said lower end sections remains in substantial abutment with said housing and said ribbon effectively slides through said passageway deflectably conforming to the shape thereof to expose a different segment of said ribbon through said window.*

*16. The invention according to claim 15 wherein said rocker operator means comprises an actuator element and a shell-like cap detachably mounted thereto, said actuator element having front and rear raised shoulders extending along the upper outer perimeter thereof in a direction perpendicular to said pivotal axis, said shell-like cap having said window and resting on said shoulders to define said passageway therebetween.*

*17. The invention according to claim 16 wherein said actuator element has front and rear bushings and is pivotally mounted to said housing by means of a pivot pin extending through said bushings, and wherein said cap has front and rear downwardly opening detented bifurcations snap-mounted to said bushings, and wherein said actuator element further has front and rear ledges formed therein upon which rests bottom edges of front and rear sides of said cap to afford unified rocking of said cap and said actuator element.*

*18. The invention according to claim 15 wherein said rocker operator means comprises an actuator element and a shell-like cap mounted thereto, said cap being of generally M-shaped configuration having a top central horizontal face between a pair of upwardly slanted faces, said window being formed in said central face and including a lense inserted from above against an upwardly facing shoulder formed in the perimeter of the opening defining said window, said ribbon bowing slightly away from the underside of said central surface to compensate non-flush tolerance deviations between the underside of said lense and said central surface.*

*19. The invention according to claim 15 wherein said rocker operator means comprises an actuator element and a shell-like cap mounted thereto, said cap being of generally M-shaped configuration having a pair of oppositely upwardly slanted faces, said window being formed in one of said slanted faces and including a lense inserted from below against a downwardly facing shoulder formed in the perimeter of the opening defining said window to enable a substantially flush edge interface of the undersides of said lense and said one slanted face along which said ribbon slides.*

* * * * *